(12) United States Patent
Borgmann et al.

(10) Patent No.: US 8,758,538 B2
(45) Date of Patent: Jun. 24, 2014

(54) ROBOTIC BASED FIBER PLACEMENT CELL WITH STATIONARY DISPENSING HEAD AND CREEL

(75) Inventors: Robert E. Borgmann, Maineville, OH (US); Stephen J. Albers, Norwood, OH (US); R. William Kneifel, II, Crestview Hills, KY (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 560 days.

(21) Appl. No.: 12/778,462

(22) Filed: May 12, 2010

(65) Prior Publication Data

US 2011/0277935 A1 Nov. 17, 2011

(51) Int. Cl.
*B29C 70/38* (2006.01)

(52) U.S. Cl.
USPC ........... 156/169; 156/173; 156/175; 156/433; 156/441; 156/523

(58) Field of Classification Search
USPC ......... 156/169, 173, 175, 433, 441, 523, 573, 156/425
See application file for complete search history.

(56) References Cited

U.S. PATENT DOCUMENTS

| | | |
|---|---|---|
| 3,140,058 A | 7/1964 | Courtney |
| 3,309,185 A | 3/1967 | Weber |
| 3,574,040 A | 4/1971 | Chitwood et al. |
| 3,810,805 A | 5/1974 | Goldsworthy et al. |
| 3,963,185 A | 6/1976 | Quirk |
| 4,292,108 A | 9/1981 | Weiss et al. |
| 4,437,616 A | 3/1984 | Magarian et al. |
| 5,022,952 A | 6/1991 | Vaniglia |
| 5,273,602 A | 12/1993 | Gill et al. |
| 6,096,164 A | 8/2000 | Benson et al. |
| 6,107,220 A | 8/2000 | Popper et al. |
| 7,137,182 B2 | 11/2006 | Nelson |
| 7,282,107 B2 | 10/2007 | Johnson et al. |
| 7,404,868 B2 | 7/2008 | Cope et al. |
| 7,472,736 B2 * | 1/2009 | Kisch et al. .................... 156/433 |
| 2005/0236735 A1 * | 10/2005 | Oldani et al. .................. 264/257 |

(Continued)

FOREIGN PATENT DOCUMENTS

| | | | |
|---|---|---|---|
| FR | 2579130 A1 | * | 9/1986 |
| GB | 2147561 A | * | 5/1985 |
| WO | 2009062749 A1 | | 5/2009 |

OTHER PUBLICATIONS

Ermert, et al, "R U Reinforcing plastics with robots?" Plastics Engineering, May 1981, pp. 37-46.*

(Continued)

*Primary Examiner* — Jeff Aftergut
(74) *Attorney, Agent, or Firm* — Reising Ethington P.C.

(57) ABSTRACT

A system for applying composite fiber to a lay-up tool has a fixed creel for supplying fiber to the fiber placement dispensing head and a fixed arm having a first end attached to the creel and having a second end attached to the dispensing head. The dispensing head is fixed on the end of the arm. A robot having a first and second pivot axis and at least a first wrist supports the lay-up tool. The robot manipulates the tool for application of fiber from the head to the tool. Manipulating the tool instead of the dispensing head allows the path length for the fiber between the creel and head to be fixed in length and orientation during application of fiber to the tool.

15 Claims, 4 Drawing Sheets

(56) References Cited

U.S. PATENT DOCUMENTS

| | | | |
|---|---|---|---|
| 2005/0247396 A1* | 11/2005 | Oldani et al. | 156/173 |
| 2007/0029030 A1* | 2/2007 | McCowin | 156/173 |
| 2007/0044919 A1* | 3/2007 | Hoffmann | 156/430 |
| 2009/0095410 A1* | 4/2009 | Oldani | 156/189 |
| 2009/0101277 A1 | 4/2009 | Cramer et al. | |
| 2010/0200168 A1* | 8/2010 | Oldani et al. | 156/441 |

OTHER PUBLICATIONS

Translation of French Patent 2579130, date unknown.*

"Coriolis composites a la fibre robot", Plastiques & Caoutchoucs Magazine, Apr. 2007, one page.*

European Search Report; EP 11 16 5497; dated Nov. 21, 2011; 4 pages.

* cited by examiner

US 8,758,538 B2

ROBOTIC BASED FIBER PLACEMENT CELL WITH STATIONARY DISPENSING HEAD AND CREEL

FIELD OF THE DEVICE

The device relates to a fiber placement cell for making fiber composite structures in which the dispensing head and creel are stationary relative to each other and the lay-up tool is mounted on the end of a movable robot arm.

BACKGROUND

Present day fiber placement systems for making composite parts use a stationary or rotating tool or workpiece with the dispensing head mounted on the end of a highly movable robot arm or other multi-axis manipulation system. U.S. Pat. No. 5,022,952 to Vaniglia shows a typical fiber placement system of this type. The robot arm or multi-axis system manipulates the dispensing head to apply the fiber to the tool in the desired pattern. In some systems, the tool may be mounted for rotation. The fiber is supplied from a creel that typically is fixed to the first axis of the manipulator, and the manipulation of the head by the robot arm requires that the fiber travel along a path that is continually changing in length and orientation. A modern fiber placement head typically moves through six degrees of freedom in delivering fiber to the part. This motion of the head results in stresses on the fiber which can cause it to break, and the mechanism used to guide and tension the fiber between the creel and the head is expensive and complex. The power, signal, and pneumatic lines that lead to the head also have to bend and move in response to the motion of the head. In order to accommodate this motion, the lines have to be designed with a certain amount of slack and free play along their length, and this increases the weight that has to be supported by the arm, slows down the motion of the arm and the head, reduces clearance between the layup system and the tool, and adds additional cost to the overall system.

The ability to quickly and automatically change out the dispensing head and/or the spools of fiber greatly improves the productivity of a fiber placement system. The currently available fiber placement systems which incorporate these features employ dockable, integrated head and creel assemblies which are attached to and move with the movable arm by means of commercial docking mechanisms, also referred to as tool changers. In addition to providing the mechanical load bearing support for the dispensing head, these docking mechanisms also have to provide automatic coupling and decoupling for all for the various electrical and pneumatic lines that lead to the head. In addition to the above mentioned issues associated with manipulating the required utilities through six degrees of freedom, this complexity further increases the potential for unreliability and adds even more cost to the system.

SUMMARY OF THE INVENTION

A fiber placement dispensing head is mounted on the end of a fixed support, the creel is fixed, and the lay-up tool is mounted on the end of a movable robot arm. The dispensing head remains stationary during fiber application to the tool, and the robot arm manipulates the tool as required to achieve the desired pattern of fiber application to the part. Tow material is directed to the head in nearly a straight line, without twisting or path length changes. The robot may be mounted on a linear slide to extend the reach of the robot arm to the tool, as may be required when applying fiber to an elongated part, or to allow fiber to be supplied from other work stations. The fixed head and creel provides a simple fixed path for the fiber between the creel and the fiber placement head, and simplifies the routing of utilities to the head. For parts which require different fiber blends to be applied to different segments of the workpiece, a number of different creels and heads may be positioned along the linear slide, and the robot can travel along the slide so that different fiber blends can be applied to the tool according to the part specification.

DESCRIPTION OF THE PREFERRED EMBODIMENT

Figure 1:
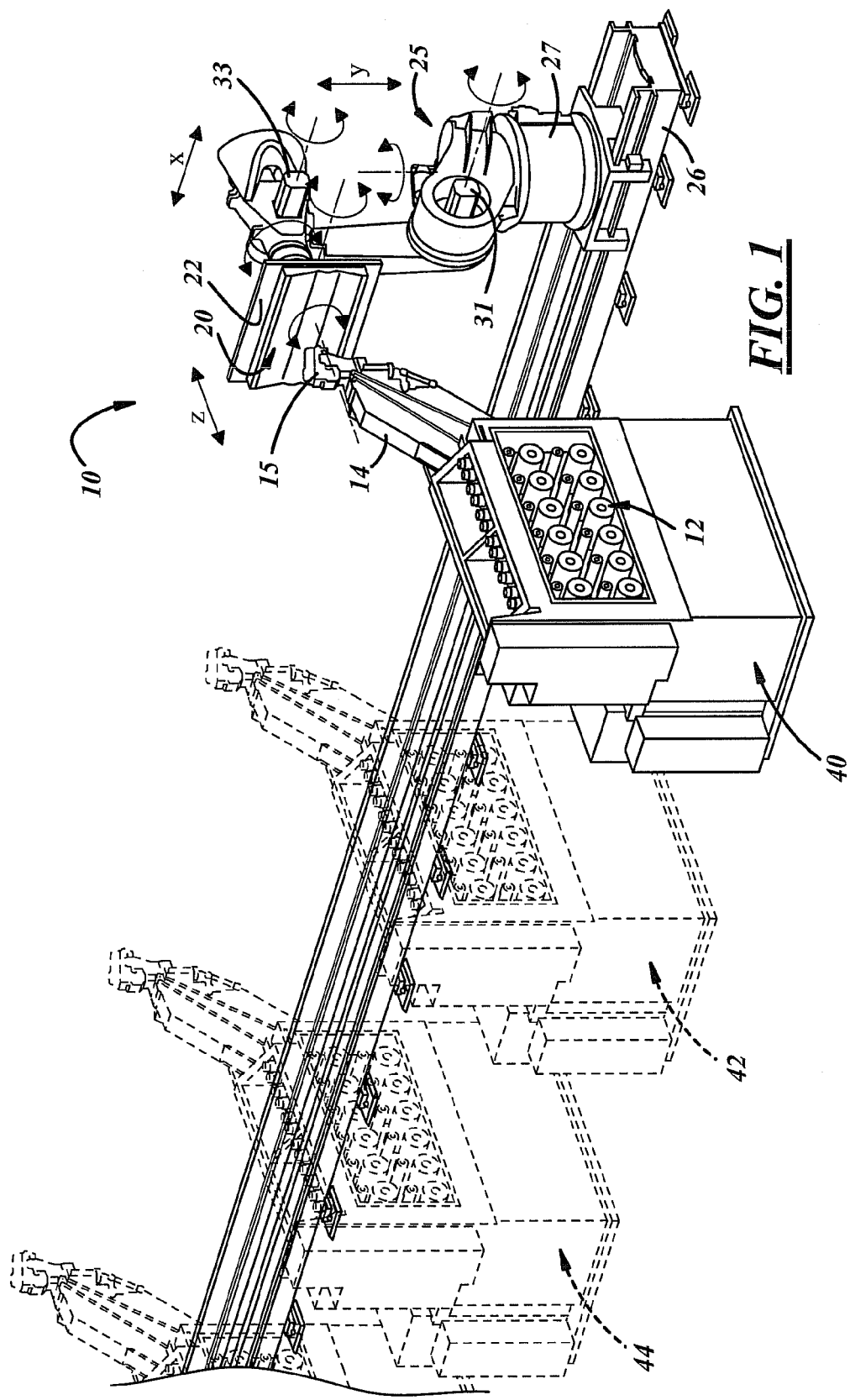
FIG. 1 is a perspective view of a robot used to manipulate a lay-up tool relative to a stationary fiber placement dispensing head and creel.

Turning now to the drawing figures, FIG. 1 shows a robotic fiber placement cell with a stationary dispensing head and creel generally designated by the reference numeral 10. The cell comprises a creel 12 that is mounted in a fixed position on the floor. A fixed arm 14 is mounted next to the creel 12, and a fiber placement dispensing head 15 is mounted on the end of the arm 14 that is remote from the creel. Although not shown, an operator's platform may be positioned adjacent to the creel 12, and a control panel for operating and monitoring the fiber placement cell may be located on the operator's platform.

Figure 2:
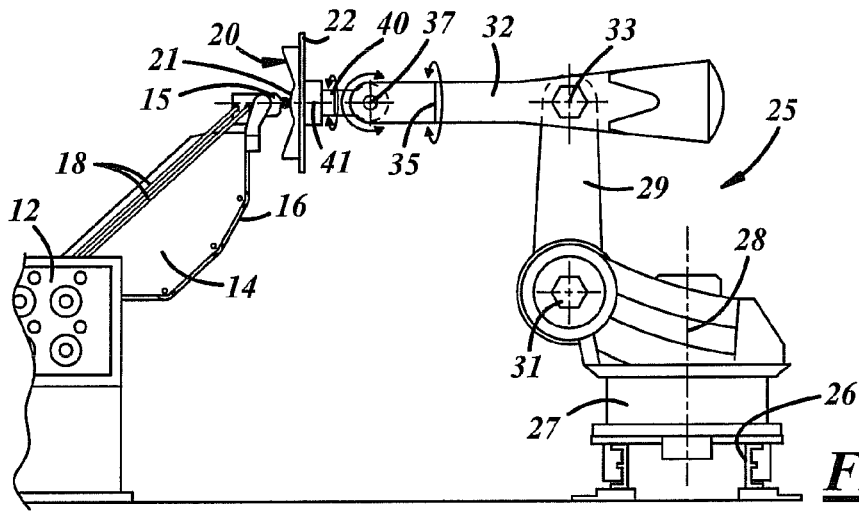
FIGS. 2-4 are side views of a lay-up tool on the end of a robot arm in several orientations to receive fiber from a stationary dispensing head.
Figure 3:
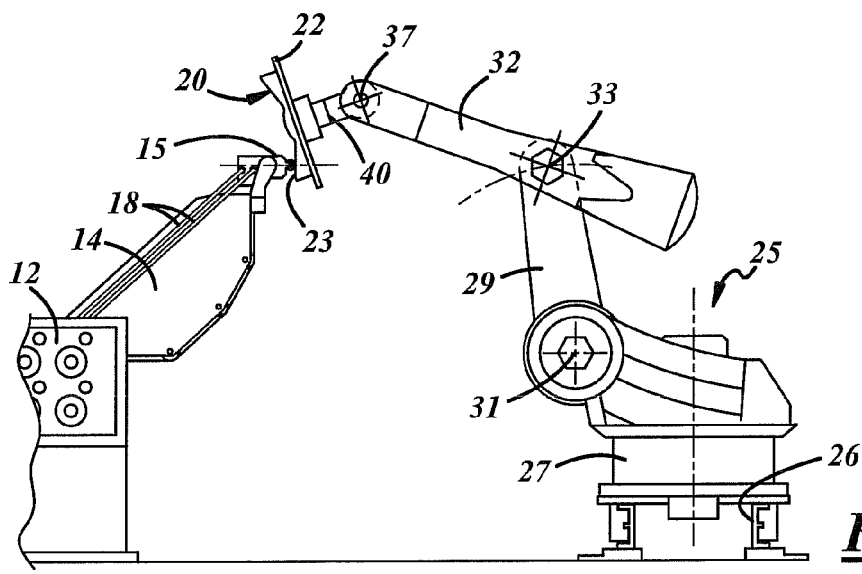
Figure 4:
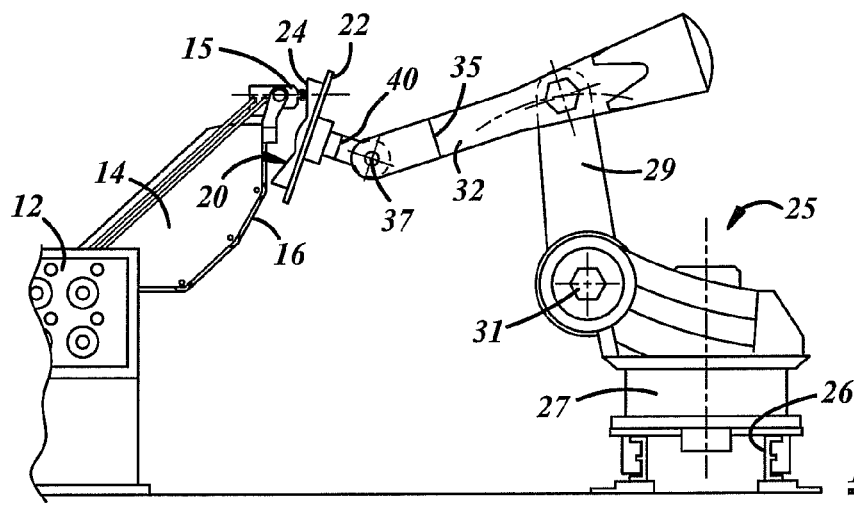

The creel 12 utilizes standard spool mounting and tensioning components (not shown) to control the flow of the fiber from the creel to the head 15. As best seen in FIGS. 2-4, tow material 16 is routed from the creel 12 to the dispensing head 15 in a nearly straight line along the length of the arm 14, without twisting or changing direction or length as is normally required along the tow delivery path of prior art fiber placement systems. The nearly straight line path for the tow material 16 avoids potential damage to the tow material that can occur as a result of maneuvering the arm and the head in order to apply the tow to the tool. The constant length path eliminates the need for a servo controlled tensioning system that has to take up slack in the fiber in response to the path length shortening, and allows the use of a passive drag type tensioning system. For purposes of clarity, FIGS. 2-4 show the tow material 16 routed along the underside of the arm 14, but other routes such as along the sides or top of the arm, or through the interior of the arm, may be used as desired.

Utilities 18 such as electrical power and control cables, and pneumatic hoses, are easily routed along the arm 14 to the dispensing head 15 in a reliable, cost effective manner. Since the utilities 18 are stationary, the utilities routing at the head itself can be configured to optimize the available clearance between the lay-up or part tooling 20 and the dispensing head 15. The stationary dispensing head 15 and arm 14 eliminate strain and fatigue stress on the utilities cables, hoses, and connectors of the utilities 18 since bending and flexing is eliminated.

In the preferred embodiment, a robotic mechanism 25 having six degrees of freedom is mounted on a linear slide 26 at a location that is opposite to the dispensing head 15, and is used to support the part tooling 20 that is attached to a mounting plate 22. The linear slide 26 is used to extend the range of the robot 25, and other systems may use a different method for extending the range of the robotic mechanism. The robot 25 comprises a base 27 that is capable of rotation about a vertical axis 28. A first end of a lower arm 29 is mounted to the base 27 by a first pivot 31. A second end of the lower arm 19 is coupled to an upper arm 32 by a second pivot 33. A first wrist mechanism 35, a rolling wrist, is provided at the end of the upper arm 32 that is remote from the second pivot 33, and the first wrist 35 is capable of rotary motion around the longitudinal axis of the upper arm 32. A second wrist mechanism 37, a bending wrist, is provided on the end of the first wrist 35, and the second wrist 37 allows pivoting motion around an axis that is that is perpendicular to the rotation of the first wrist 35. A third wrist mechanism 40, a rolling wrist, is provided on the end of the second wrist 37, and the third wrist 40 allows rotation around an axis that is perpendicular to the pivoting axis of the second wrist 37. The robot 25 that is shown is a standard industrial robot having six degrees of freedom, although robots having other degrees of freedom and other arrangements of arms and wrists may be used as desired.

The robot 25 manipulates the lay-up tooling 20 relative to the dispensing head 15 to lay up the fiber tow 14 at the proper speed and angular orientation. FIG. 2 shows the robot 25 holding the lay-up tooling 20 in a position so that the head is opposite a center portion 21 of the tool that has a surface that is parallel to the mounting plate 22. FIG. 3 shows the robot 25 holding the tooling 20 in a position so that the dispensing head 15 is opposite a lower portion 23 of the tool that has a surface that is inclined in one direction relative to the mounting plate 22. FIG. 4 shows the robot 25 holding the tooling 20 in a position so that the dispensing head 15 is opposite an upper portion of the tool 24 that has a surface that is inclined in a different direction relative to the mounting plate 22 than the inclination of the lower portion 23 of the tool. Thus, the robot 25 is able to cause relative movement between the dispensing head 15 and the lay-up tool 20 during application of composite fiber to the lay-up tool so that composite fiber may be applied to the lay-up tool in the desired pattern and orientation while the path length for the composite fiber between the creel 12 and the dispensing head 15 remains relatively constant.

The robot base 27 is mounted on a linear slide 26, and the slide is of sufficient length to permit the robot to carry the lay-up tooling 20 to other work stations which are provided with additional creel and dispensing head systems. As shown in FIG. 1, and as an example only, the creel located at station 40 may provide fiber that is used for the base layers of a part, the creel located at station 42 may provide fiber that is used for the intermediate layers of a part, and the creel located at station 44 may provide fiber that is used for the outer layers of a part. Allowing the robot 25 with the tooling 20 to travel from the first station 40 to the second station 42 and from the second station 42 to the third station 44 allows the tooling to receive different fiber blends at the different stations, and takes the place of changing heads with conventional fiber placement systems in order to apply alternate materials to the part tooling 20. Allowing the robot 25 with the tooling 20 to travel from station to station also allows the fiber that is being delivered to the tool to be changed without providing complex docking mechanisms for multiple heads that carry distinct fiber supplies that are applied to the tool. Moving the robot 25 from one station to another also permits production to continue at one station while material loading, repair, and/or maintenance operations are performed at one or more idle stations.

Figure 5:
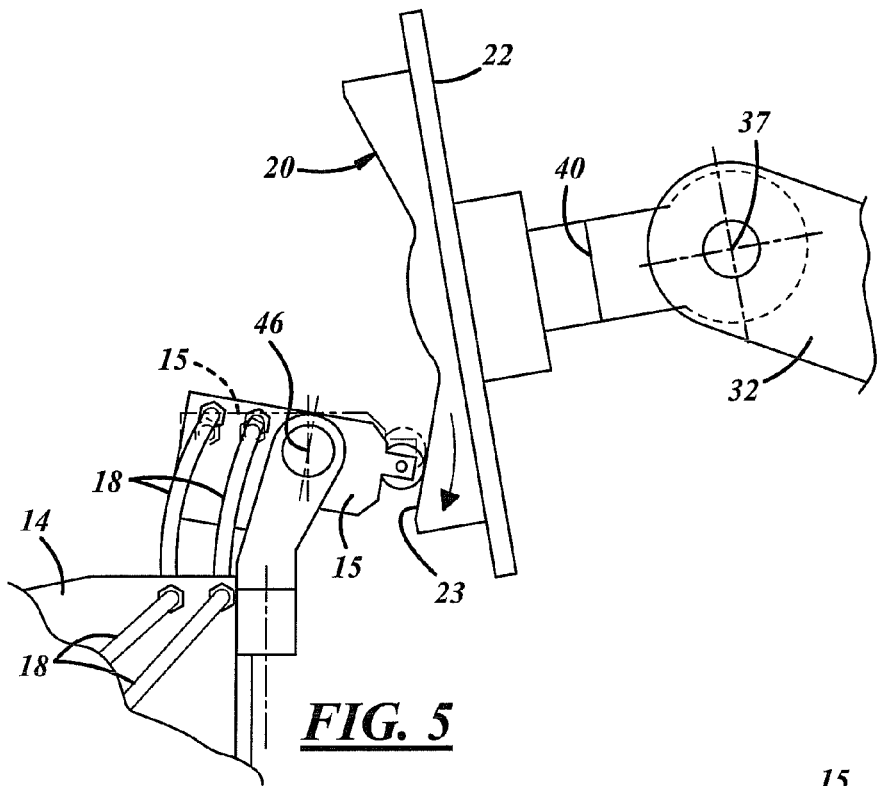
FIG. 5 is a side view of a lay-up tool on the end of a robot arm in which the dispensing head includes limited up and down motion.
Figure 6:
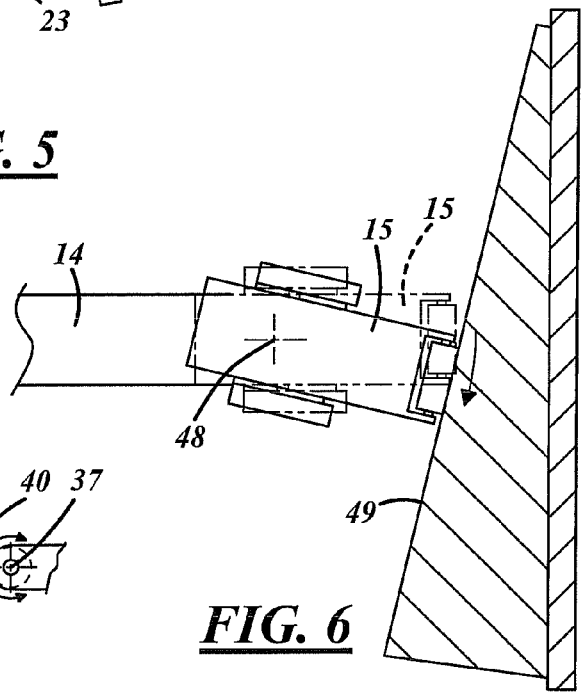
FIG. 6 is a top view of a tool on the end of a robot arm in which the dispensing head includes limited side-to-side motion.

In an alternative embodiment shown in FIGS. 5 and 6, the dispensing head 15 is not fixed on the end of the arm 14, but is provided with two degrees of freedom. FIG. 5 shows the dispensing head 15 provided with a horizontal pivot axis 46 that allows the head to change its pitch, that is, to tilt up and down relative to the horizontal axis. The dispensing head 15 shown in solid in FIG. 5 has been tilted downward so that it is at the proper angle to apply fiber to the lower part 23 of the tool. The head 15 shown in phantom in FIG. 5 is facing straight ahead, so that the axis of the head from the front to the back of the head is horizontal.

FIG. 6 shows the dispensing head 15 provided with a vertical pivot axis 48 that allows the head to roll, that is, to move from side to side about the vertical axis 48. In FIG. 6 the dispensing head 15 is tilted to the side to apply fiber to the angled part 49 of the lay-up tool. The head shown 15 in phantom in FIG. 6 is facing straight ahead, with the axis from the front to the back of the head in alignment with the longitudinal axis of the arm 14. Providing the head with two degrees of motion about the horizontal axis 46 and the vertical axis 48 allows the head to follow the contour of the tool more quickly, since both the head and the tool are able to change orientation to correctly position the head for the application of fiber to the tool 20. Because the motion of the head is limited to two degrees of freedom, the change in the tow path length and direction from the arm 14 to the head 15 is minimized, and the amount of slack and free play in the utilities 18 are also greatly reduced when compared to a head that is designed to apply fiber to a stationary tool. The additional degree of freedom in the fiber placement head also permits the part programmer to balance the available clearance between the systems on the head and the contours of the layup tool surface, thus enabling layup of more extreme surface irregularities.

Figure 7:
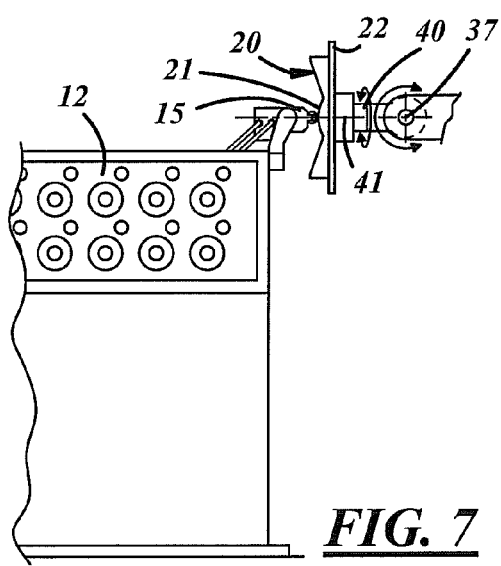
FIG. 7 shows an alternate embodiment in which the fiber placement head is mounted directly on the creel.

FIG. 7 shows an alternate embodiment in which the arm 14 as shown in FIGS. 1-4 may be eliminated completely, and the dispensing head 15 may be mounted directly onto the creel 12.

Figure 8:
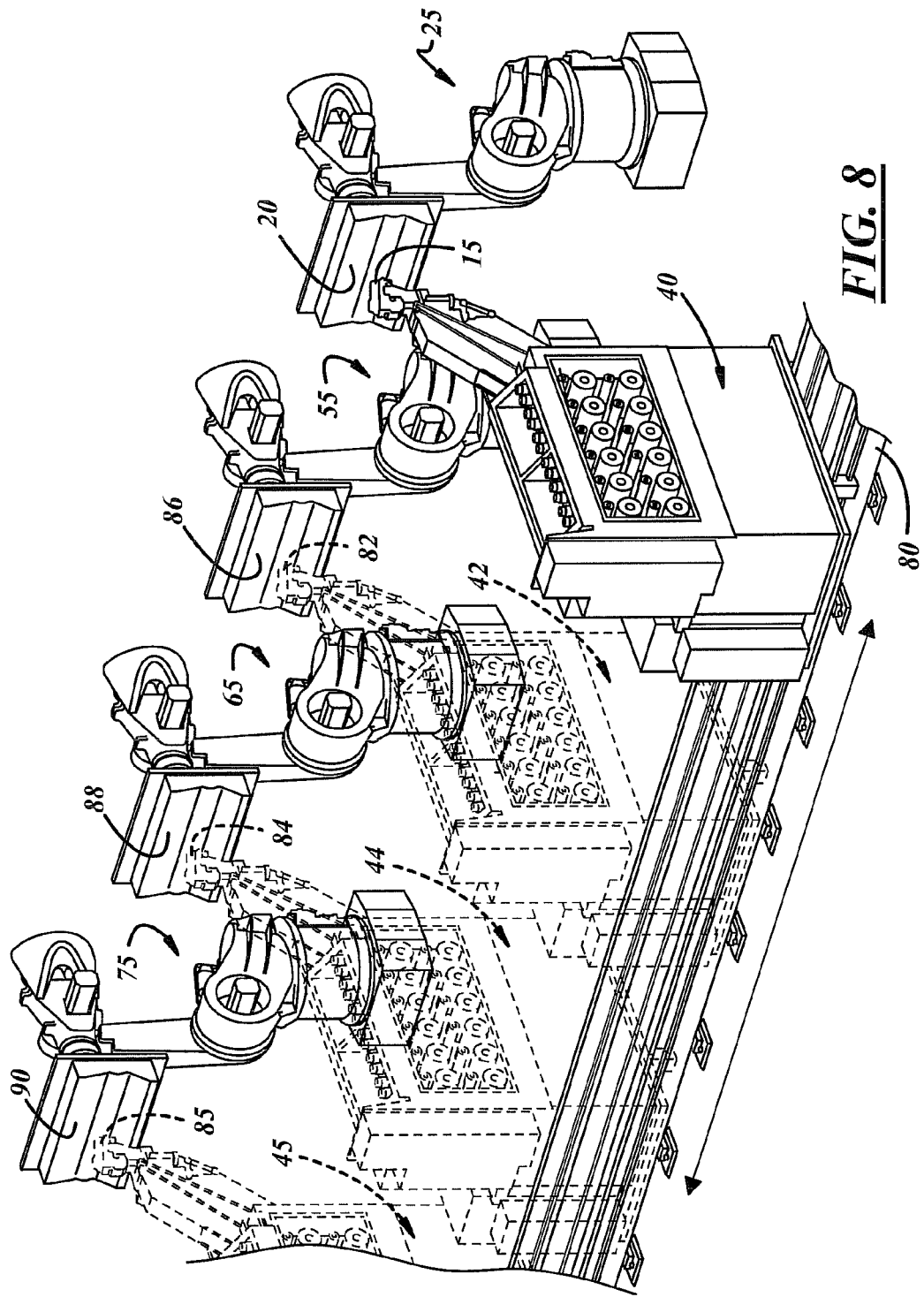
FIG. 8 shows an alternate embodiment in which several creels are mounted on a rail for motion relative to the lay-up tool.

FIG. 8 shows an alternate embodiment in which one or more robots 25, 55, 65, and 75 are fixed, and several creels 40, 42, 44 and 45 with fixed heads are mounted on a rail 80 for movement relative to the robots. Using this embodiment, a first creel 40 and dispensing head 15 are moved into position opposite the first robot 25 in order to apply fiber from the head 15 attached to the first creel 40 to the lay-up tool 20, and thereafter a second creel 42 and head 82 are moved into position opposite the first robot 25 and the lay-up tool 20 in order to apply fiber from the head attached to the second creel 42 to the lay-up tool 20. Thereafter the third creel 44 and head 84 are moved into position opposite the first robot 25 and the lay-up tool 20 in order to apply fiber from the head 84 attached to the third creel 44 to the lay-up tool 20. Thereafter the fourth creel 45 and head 85 are moved into position opposite the first robot 25 and the lay-up tool 20 in order to apply fiber from the head 84 attached to the third creel 44 to the lay-up tool 20. Of course, with the arrangement of creels and roots shown in FIG. 8, any of the creels 40, 42, 44 and 45 may be moved into position in front of the robots 25, 55, 65, and 75 for the purpose of applying fibers from the creels 40, 42, 44 and 45 to any of the lay-up tools 20, 86, 88, or 90 as desired.

Having thus described the device, various modifications and alterations will occur to those skilled in the art, which modifications and alterations are intended to be within the scope of the device as defined by the appended claims.

We claim:

1. A process for applying composite fiber to a tool, the process comprising the steps of:
   rigidly mounting a first fixed fiber placement head so that it is incapable of motion;
   mounting a first creel in a fixed position at a first station on the floor for supplying fiber to the first fixed fiber placement head;
   attaching a first end of a fixed arm to the creel and attaching a second end of the arm to the first fixed fiber placement head; and,
   supporting a movable lay-up tool by a movable robot,
   providing a first and second pivot axis and a first wrist for the robot;
   manipulating the tool using the first and second pivot axis and the first wrist of the robot during the application of fiber from the first fixed fiber placement head, whereby the first fixed fiber placement head remains fixed during the application of fiber to the tool.

2. The process of claim 1 further comprising the steps of:
   supporting the robot on a track; and,
   moving the robot along the track relative to the creel.

3. The process of claim 1 further comprising the steps of:
   providing a robot base and coupling a lower arm to the robot base by the first pivot axis;
   coupling an upper a in to the lower arm by the second pivot axis;
   providing a second wrist; and,
   manipulating the tool using the second wrist.

4. The process of claim 3 further comprising the steps of:
   providing a base rotation mechanism having a vertical axis for the robot base; and,
   rotating the robot base about the vertical axis.

5. The process of claim 4 further comprising the steps of:
   providing a third pivot axis for the robot, the third pivot axis being provided by the second wrist.

6. The process of claim 1 further comprising the steps of:
   rigidly coupling the first fiber placement head to the first fixed arm, whereby the fiber path between the creel and the dispensing head is fixed and does not change length or orientation as the tool is manipulated by the robot to receive fiber from the fiber placement head.

7. The (apparatus) of claim 2 further comprising:
   mounting a second creel in a fixed position at a second station on the floor spaced from the first creel;
   attaching a first end of a second fixed arm to the second creel;
   attaching a second fixed fiber placement head to the second end of the second fixed arm;
   moving the robot along the track from the first station to the second station; and,
   delivering fiber to the tool from the first fiber placement head at the first station and subsequently from the second fixed fiber placement head at the second station.

8. A process for applying composite fiber to a lay-up tool, the process comprising:
   providing a creel;
   mounting a fiber placement head in a fixed position relative to the creel;
   providing a mechanism for causing relative movement between the fiber placement head and the lay-up tool during application of composite fiber to the lay-up tool;
   applying composite fiber to the lay-up tool in the desired pattern and orientation while the path length for the composite fiber between the creel and the fiber placement head remains relatively constant;
   maintaining the fiber placement head stationary during fiber application to the tool; and,
   using the mechanism to provide relative motion between the tool and the fiber placement head as required to achieve a desired pattern of fiber application to the tool.

9. The process of claim 8 further comprising the steps of:
   supporting the lay-up tool using a robot, whereby the robot comprises the mechanism for causing relative motion between the fiber placement head and the lay-up tool during application of composite fiber to the lay-up tool.

10. The process of claim 9 further comprising the steps of:
    providing a plurality of creels;
    supplying composite fiber to the lay-up tool using the plurality of creels;
    supporting either the creels or the robot on a rail; and,
    positioning the robot and the lay-up tool opposite a selected one of the creels for application of composite fiber from a selected one of the creels.

11. The process of claim 10 further comprising the steps of:
    maintaining the creels in a fixed position;
    supporting the robot on the rail; and,
    moving the robot and the dispensing head along the rail to receive composite fiber from a selected one of the creels.

12. The process of claim 11 further comprising the steps of:
    supporting the creels and the position of the robot in a fixed position; and,
    moving the creels along the rail to deliver composite fiber from a selected one of the creels to the dispensing head.

13. The process of claim 9 further comprising the steps of:
    attaching a fixed arm to the creel;
    mounting the fiber placement head on one end of the fixed arm; and,
    attaching the other end of the arm to the creel.

14. The process of claim 9 further comprising the step of attaching the fiber placement head directly to the creel.

15. A process of applying composite fiber to a tool comprising the steps of:
    restricting the motion of a first fiber placement head to only one axis;
    mounting a first fixed creel on the floor;
    supplying fiber from the first fixed creel to the first fiber placement head;
    attaching a first end of a fixed arm to the creel and a second end of the fixed arm to the first fiber placement head;
    supporting a movable lay-up tool by a robot, the robot having a first and second pivot axis and at least a first wrist for manipulating the tool;
    manipulating the tool using the robot for application of fiber from the first fiber placement head;
    coupling the first fiber placement head to the fixed arm by a first pivot axis; and,
    moving the first fiber placement head about the first pivot axis relative to the end of the fixed arm, wherein the first fiber placement head is otherwise incapable of movement during fiber application in a desired pattern to the tool.

* * * * *